Patented June 8, 1937

2,083,213

UNITED STATES PATENT OFFICE 2,083,213

RECOVERY OF HYDROGEN SULPHIDE FROM GASES

Hans Baehr and Karl Braus, Leuna, Germany, assignors to I. G. Farbenindustrie Aktiengesellschaft, Frankfort-on-the-Main, Germany No Drawing. Application June 22, 1935, Serial No. 28,020. In Germany June 29, 1934

4 Claims. (Cl. 23—181)

The present invention relates to the recovery of hydrogen sulphide from gases containing the same, more particularly from such gases as contain both hydrogen sulphide and carbon dioxide.

It has already been proposed to wash out hydrogen sulphide and carbon dioxide from gases containing the same by means of absorption liquids which contain as the active substances compounds having an alkaline reaction, as for example aqueous solutions of soda or potash, or of salts of strong inorganic or organic bases with weak organic acids, or of amines, especially alkylolamines. The said gaseous weak acids are dissolved by the absorption liquids in the cold and are recovered therefrom by heating the liquids. The gas thus expelled consists of a mixture of carbon dioxide and hydrogen sulphide, the ratio of the proportions of which differs according to the composition of the initial gas. For many purposes, especially for exploiting the hydrogen sulphide obtained, it is desirable, however, to obtain a gas mixture containing the highest possible percentage of hydrogen sulphide. This is as a rule impossible according to the known processes.

We have now found that high percentage hydrogen sulphide may be obtained from gases containing carbon dioxide in addition to hydrogen sulphide while employing absorption liquids which absorb hydrogen sulphide and carbon dioxide in the cold and give them up again when heated, by bringing the absorption liquid into contact with the gas in a finely subdivided, as for example atomized form, while keeping the time of contact of the absorption liquid with the gas at less than five seconds and preferably at about one second or less.

As absorption liquids suitable for the process in accordance with the present invention may be mentioned for example the aqueous solutions of inorganic salts having an alkaline reaction, as for example soda, potash, borates, phosphates, metaborates or arsenites, or solutions of organic bases, as for example ethanol-amines, ethylene diamine, ethanol diamines, ethylene polyamines, such as diethylene triamines, or the alkylated or hydroxyalkylated derivatives of these bases, or solutions of salts of weak organic acids, as for instance aminocarboxylic acids and aminosulphonic acids, as for example taurine, alanine and their derivatives, with strong inorganic or organic bases.

The known atomizing nozzles, disintegrators, Theisen washers, Feld washers or Ströder washers may be employed for the fine division of the washing liquids.

The washing temperature is preferably kept as low as possible and the concentration of the washing liquid as high as possible, so that the solution may be laden as highly as possible with hydrogen sulphide. When working in the said manner, the concentration of the solution may be kept higher than is possible in the usual gas washing in towers because the liquid absorbs little or no carbon dioxide and the danger of precipitation and thickening of the absorption liquid by the formation of carbonates is thus avoided. In cases when working up gases very rich in carbon dioxide, when it is not desired that the small amounts of carbon dioxide then absorbed by the absorption liquid should be present in the hydrogen sulphide, the liquid is preferably regenerated in two stages, the first stage being carried out at a temperature somewhat below the boiling point, the gas thus escaping, which consists of practically pure hydrogen sulphide, being withdrawn separately.

The advantage of the process according to this invention consists not only in the possibility of recovering high percentage hydrogen sulphide from gases containing both hydrogen sulphide and carbon dioxide, but also in the fact that the absorptive capacity for gaseous weak acids of the absorption liquids is utilized solely for the absorption of hydrogen sulphide so that the solutions have an increased activity for the desulphurization of gases.

The following example will further illustrate how this invention may be carried out in practice, but the invention is not restricted to this example.

*Example*

It is desired to purify a waste gas derived from the destructive hydrogenation of coal and containing 6 per cent of carbon dioxide and 7 per cent of hydrogen sulphide until it contains only 0.5 per cent of hydrogen sulphide. An aqueous about 30 per cent solution of alanine sodium salt is employed for the purpose.

The purification is effected by spraying the absorption liquid into two disintegrators arranged one behind the other, through which the gas is led in counter current to the solution. 3.6 cubic meters of solution are used for each 1000 cubic meters of the gas. Each cubic meter of solution absorbs about 18 cubic meters of hydrogen sulphide, but only about 1.5 cubic meters of carbon dioxide. The gas expelled from the liquid contains about 92 per cent of hydrogen sulphide.

If the purification be carried out in a washing tower provided with Raschig rings, each 1000 cubic meters of gas require 5.9 cubic meters of washing liquid for the same degree of purification. After the absorption, each cubic meter of the liquid contains 11 cubic meters of hydrogen sulphide and 7.3 cubic meters of carbon dioxide. The gas obtained by expelling from the liquid is composed of 60 per cent of hydrogen sulphide and 40 per cent of carbon dioxide.

Thus in order to obtain the same degree of purity according to this invention 2.3 cubic meters less of solution are required for each 1000 cubic meters of gas than when employing washing towers. In this manner there is a considerable saving in steam for the regeneration, because with a steam consumption of 100 kilograms for each cubic meter of solution, 230 kilograms less steam are used for the purification of each 1000 cubic meters of gas.

What we claim is:—

1. The process of recovering hydrogen sulphide from a gas containing the same in addition to carbon dioxide, which comprises scrubbing said gas in the cold with a solution having an alkaline reaction and capable of taking up hydrogen sulphide and carbon dioxide in the cold and of giving them off on heating, while bringing the solution into contact with the gas in a sprayed form and keeping the time of contact of the solution with the gas at less than 5 seconds.

2. The process of recovering hydrogen sulphide from a gas containing the same in addition to carbon dioxide, which comprises scrubbing said gas in the cold with a solution having an alkaline reaction and capable of taking up hydrogen sulphide and carbon dioxide in the cold and of giving them off on heating, while bringing the solution into contact with the gas in a sprayed form and keeping the time of contact of the solution with the gas not higher than about one second.

3. The process of recovering hydrogen sulphide from a gas containing the same in addition to carbon dioxide, which comprises scrubbing said gas in the cold with a solution of a salt of a weak organic acid, said solution having an alkaline reaction and capable of taking up hydrogen sulphide and carbon dioxide in the cold and of giving them off on heating, while bringing the solution into contact with the gas in a sprayed form and keeping the time of contact of the solution with the gas at less than 5 seconds.

4. The process of recovering hydrogen sulphide from a gas containing the same in addition to carbon dioxide, which comprises scrubbing said gas in the cold with a solution of alanine sodium salt, while bringing the solution into contact with the gas in a sprayed form and keeping the time of contact of the solution with the gas at less than 5 seconds.

HANS BAEHR.
KARL BRAUS.